(12) United States Patent
Chen

(10) Patent No.: US 10,805,622 B2
(45) Date of Patent: Oct. 13, 2020

(54) HIGH EFFICIENCY VIDEO CODING METHOD AND APPARATUS, AND COMPUTER-READABLE STORAGE MEDIUM

(71) Applicant: Tencent Technology (Shenzhen) Company Limited, Shenzhen (CN)

(72) Inventor: XuWei Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/424,573

(22) Filed: May 29, 2019

(65) Prior Publication Data

US 2019/0281316 A1 Sep. 12, 2019

Related U.S. Application Data

(63) Continuation of application No. PCT/CN2018/078578, filed on Mar. 9, 2018.

(30) Foreign Application Priority Data

Mar. 22, 2017 (CN) .......................... 2017 1 0173193

(51) Int. Cl.
*H04N 19/436* (2014.01)
*H04N 19/105* (2014.01)
(Continued)

(52) U.S. Cl.
CPC .............. *H04N 19/436* (2014.11); *G06T 1/20* (2013.01); *H04N 19/105* (2014.11);
(Continued)

(58) Field of Classification Search
USPC .................................................... 375/240.02
See application file for complete search history.

(56) References Cited

U.S. PATENT DOCUMENTS 9,667,995 B2 5/2017 Sato
2016/0328833 A1* 11/2016 Kiyota ............... H04N 5/23293
2017/0195689 A1 7/2017 Sato

FOREIGN PATENT DOCUMENTS

| CN | 102685505 A | 9/2012 |
| CN | 104054346 A | 9/2014 |
| CN | 106851298 A | 6/2017 |

OTHER PUBLICATIONS

Chinese Office Action dated Mar. 5, 2019 in Chinese Patent Application No. 2017101731934 with Concise English Translation.
(Continued)

*Primary Examiner* — Patricia I Young
(74) *Attorney, Agent, or Firm* — Oblon, McClelland, Maier & Neustadt, L.L.P.

(57) ABSTRACT

Aspects of the present disclosure provide a method and an apparatus for video coding. In some examples, the apparatus includes processing circuitry that divides a first video image into a plurality of pixel blocks of the same size. The processing circuitry selects, from the plurality of pixel blocks of the first video image, one or more pixel blocks on a straight line that is parallel to or overlapping with a diagonal line of the first video image, one or more pixel blocks on a neighboring parallel line of the straight line being previously coded. Then the processing circuitry performs a parallel coding on the one or more pixel blocks on the straight line based on the one or more coded pixel block on the neighboring parallel line.

20 Claims, 9 Drawing Sheets

First frame

Second frame

Third frame,
Fourth frame,
...

(51) Int. Cl.
*H04N 19/119* (2014.01)
*H04N 19/167* (2014.01)
*H04N 19/176* (2014.01)
*G06T 1/20* (2006.01)

(52) U.S. Cl.
CPC ......... *H04N 19/119* (2014.11); *H04N 19/167* (2014.11); *H04N 19/176* (2014.11)

(56) References Cited

OTHER PUBLICATIONS

International Search Report dated Jun. 14, 2018 in International Application No. PCT/CN2018/078578 with English Translation.
Written Opinion dated Jun. 14, 2018 in International Application No. PCT/CN2018/078578.
Zhao, Jie et al, "CE6: Parallel Prediction Unit for Parallel Intra Coding", JCTVC-D074, 4$^{th}$ Meeting, Jan. 2011.
Zhao, Jie et al, "CE6: Parallel Prediction Unit for Parallel Intra Coding", JCTVC-E315, 5$^{th}$ Meeting, Mar. 2011.
Alvarez-Mes, M.et al, "Improving parallelization efficiency of WPP using Overlapped Wavefront", JCTVC-J0425, 10$^{th}$ Meeting, Jul. 2012.
Mrak, Marta et al, "CE6: Report and evaluation of new Combined Intra Prediction settings", JCTVC-D191, 4$^{th}$ Meeting, Jan. 2011.

\* cited by examiner

| Arithmetic logical unit | | | | | | | |
|---|---|---|---|---|---|---|---|
| Register | | | | | | | |
| First-level code cache 1 | First-level data cache 1 | First-level code cache 2 | First-level data cache 2 | First-level code cache 3 | First-level data cache 3 | First-level code cache 4 | First-level data cache 4 |
| Second-level cache 1 | | Second-level cache 2 | | Second-level cache 3 | | Second-level cache 4 | |
| Third-level cache | | | | | | | |

HIGH EFFICIENCY VIDEO CODING METHOD AND APPARATUS, AND COMPUTER-READABLE STORAGE MEDIUM

RELATED APPLICATION

This application is a continuation of International Application No. PCT/CN2018/078578, filed on Mar. 9, 2018, which claims priority to Chinese Patent Application No. 201710173193.4, filed on Mar. 22, 2017. The entire disclosures of the prior applications are hereby incorporated by reference in their entirety.

FIELD OF THE TECHNOLOGY

The present disclosure relates to a high efficiency video coding (HEVC) method and apparatus, an electronic device, and a computer-readable storage medium.

BACKGROUND OF THE PRESENT DISCLOSURE

The HEVC standard is a coding mode whose compression efficiency is twice as high as the currently most popular H.264/AVC standard, and is more suitable for fast coding and transcoding in a live video stream. HEVC includes predictive coding and entropy coding. HEVC belongs to a block-based hybrid coding framework, but has been enhanced and improved on each coding stage. However, search space in the HEVC coding mode is very large due to the improvement. To ensure coding quality, a coder needs to perform a large amount of computing to find a coding mode in which rate-distortion costs are relatively low, that is, to perform a mode decision (MD).

In recent years, a central processing unit (CPU)-based/graphics processing unit (GPU)-based hybrid heterogeneous computing system has gradually become a research hotspot in the field of high-performance computing. Parallelizing HEVC coding on the CPU-based/GPU-based hybrid heterogeneous computing system by performing computing by using a CPU/GPU has become an effective means of performing real-time coding on a live video stream.

At present, research related to HEVC parallel are mainly focused on an inter-frame MD, especially a motion estimation module, and less research has been done on intra-frame MD parallel. With the parallelization of the inter-frame MD, an intra-frame MD has gradually become a speed bottleneck. Tiles and wavefront parallel processing (WPP) algorithms that are supported by the HEVC standard do not reach an ideal balance between a parallelism degree and coding quality.

In the HEVC coding standard, a video image is evenly divided into a plurality of coding tree units (CTUs). The size of a CTU block may be 64×64, 32×32, or 16×16, typically and without loss of generality.

Each CTU quadtree is recursively divided into four sub-units having the same size, and each leaf node of the quadtree is referred to as a coding unit (CU). The CU is a square area, represents a leaf node obtained by dividing a CTU quadtree, and is a basic unit block for performing intra-frame or inter-frame coding. A prediction unit (PU) is divided based on a CU and is a basic unit for transmitting information related to a prediction process. Generally, each CU may include one or more PUs. A transform unit (TU) is also divided based on a CU, and is a basic unit used in a transform and quantization process. Generally, each CU may include one or more TUs.

It can be learned, by analyzing the HEVC coding standard, that there is a plurality of data dependencies in the intra-frame MD.

(1) A Reconstructed Pixel Dependency During Intra-Frame Prediction

As shown in FIG. 1, the dependency relationship occurs during the intra-frame prediction. When a prediction block (PB) or a transform block (TB) is computed, intra-frame prediction needs to be performed, that is, prediction needs to be performed on the PB or the TB with reference to a pixel that has been reconstructed (a reconstructed pixel) of an adjacent block. For an M×M TB, reference needs to be made to surrounding 4M+1 reconstructed pixels that are respectively in adjacent image areas in a left, above, lower-left, upper-right, and upper-left directions of the TB and on which coding and reconstruction are completed. If a reconstructed pixel to which reference needs to be made by a PB or TB is located in a same CTU as the PB or TB is, the reconstructed pixel is unavailable because an MD is performed on an adjacent block at the same time and reconstruction is not completed. As shown in FIG. 1, parallel processing is performed on a $block_L$, a $block_A$, and a current block that are located in a same CTU, and reconstructed pixels (pixels in gray parts in FIG. 1) of the $block_L$ and the $block_A$ and on which the current TB is dependent are unavailable.

(2) A Most Probable Mode (MPM) Computing Dependency in a Coding Prediction Mode

To improve coding compression efficiency, when the intra-frame prediction mode is performed on a current PB, reference needs to be made to prediction modes of an adjacent left PB (LPB) and an adjacent above PB (APB), to construct an MPM list having a fixed length of 3. As shown in FIG. 2, if the current PB and the LPB or the APB to which reference is made are located in the same CTU, the prediction modes of the LPB and the APB are unavailable because the MD is performed on the LPB and the APB at the same time, and the prediction modes have not been obtained yet.

(3) A Probabilistic Characteristic Model (PCM) Inherited Dependency

Entropy coding is performed on a syntactic element in HEVC through context adaptive binary arithmetic coding (CABAC). A main process of CABAC includes binarization of the syntactic element, probability modeling, arithmetic coding, and PCM updating. To improve coding efficiency, the PCM is adaptively and dynamically updated in a coding process, to better reflect a local area feature of an image to obtain a higher compression ratio. In an HM MD process, an entropy coder uses the PCM to estimate a number of bits generated during coding, to compute coding costs, and the PCM is dynamically updated by simulating an actual coding process. The PCM is transferred, after an MD of a block having a smaller zigzag scanning order is completed, to a block having a larger zigzag scanning order for use. As shown in FIG. 3, $TU_0$ uses a result obtained after last CTU computing, a PCM used by $TU_1$ is a result obtained after computing by $TU_0$, and by analogy, a PCM used by $TU_3$ is a result obtained after computing by $TU_2$. In this way, a PCM inherited dependency is formed between adjacent blocks.

The foregoing dependencies all belong to the HEVC coding process. Because of the existence of the dependencies, parallel coding cannot be performed on a CU in a CTU.

SUMMARY

Aspects of the Present Disclosure Provide a Method and an Apparatus for Video Coding.

In some examples, the apparatus includes processing circuitry that divides a first video image into a plurality of pixel blocks of the same size. The processing circuitry selects, from the plurality of pixel blocks of the first video image, one or more pixel blocks on a straight line that is parallel to or overlapping with a diagonal line of the first video image, one or more pixel blocks on a neighboring parallel line of the straight line being previously coded. Then the processing circuitry performs a parallel coding on the one or more pixel blocks on the straight line based on the one or more coded pixel block on the neighboring parallel line.

According to an aspect of the disclosure, the processing circuitry performs the parallel coding on one or more pixel blocks in a second video image such that a sum of a quantity of the one or more pixel blocks in the second video image and a quantity of the one or more pixel blocks on the straight line in the first video image is a constant. In an embodiment, the sum of the quantity of the one or more pixel blocks in the second video image and the quantity of the one or more pixel blocks on the straight line in the first video image is equal to a quantity of pixel blocks on the diagonal line of the first video image.

According to an aspect of the disclosure, one of the one or more coded pixel blocks on the neighboring parallel line is a neighboring block of one of the one or more pixel blocks on the straight line. In one embodiment, the processing circuitry performs the parallel coding on the one of the one or more pixel blocks on the straight line based on a pixel in the one of the one or more coded pixel blocks on the neighboring parallel line. In another embodiment, the processing circuitry performs the parallel coding on the one of the one or more pixel blocks on the straight line based on a neighboring pixel in the one of the one or more coded pixel blocks on the neighboring parallel line, the neighboring pixel neighboring the one of the one or more pixel blocks on the straight line.

According to an aspect of the disclosure, the processing circuitry includes a central processing unit (CPU) and a graphics processing unit (GPU). In an embodiment, the processing circuitry allocates a first quantity of pixel blocks to the CPU, and a second quantity of pixel blocks to the GPU, such that a sum of the first quantity of pixel blocks and the second quantity of pixel blocks is equal to a total quantity of pixel blocks on which the parallel coding is performed.

BRIEF DESCRIPTION OF THE DRAWINGS

The accompanying drawings, which are incorporated herein and constitute a part of this specification, illustrate embodiments consistent with the present disclosure and, together with the description, serve to explain the principles of the present disclosure.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The following implementations described in the exemplary embodiments do not necessarily represent all implementations that are the same as those of the present disclosure. On the contrary, the implementations are examples of apparatuses and methods that are described in detail in the appended claims and that are consistent with some aspects of the present disclosure.

Figure 4:
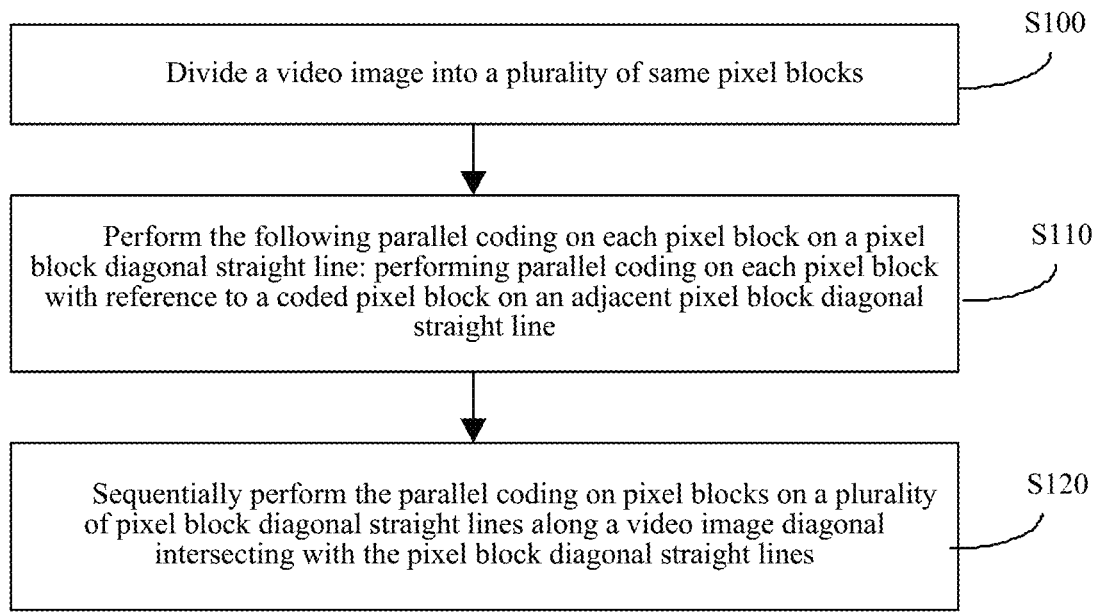
FIG. 4 is a schematic flowchart of an HEVC method according to an embodiment of the present disclosure.

FIG. 4 shows an HEVC method according to an embodiment of the present disclosure. The method includes the following steps:

In step S100, a video image is divided into a plurality of pixel blocks with each of the plurality of pixel blocks having a same size.

Figure 5:
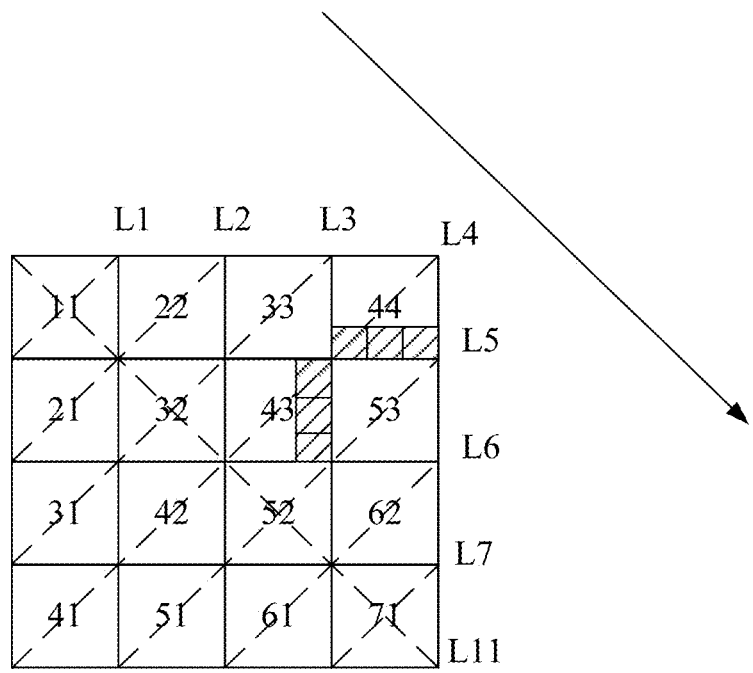
FIG. 5 is a schematic diagram of an HEVC method according to an embodiment of the present disclosure.

As shown in FIG. 5, the video image is divided into a plurality of pixel blocks. The pixel block may be a CU, a PU, or a TU.

In step S110, the following parallel coding is performed on each pixel block on a pixel block diagonal straight line: performing parallel coding on each pixel block with reference to a coded pixel block on an adjacent pixel block diagonal straight line.

Figure 6:
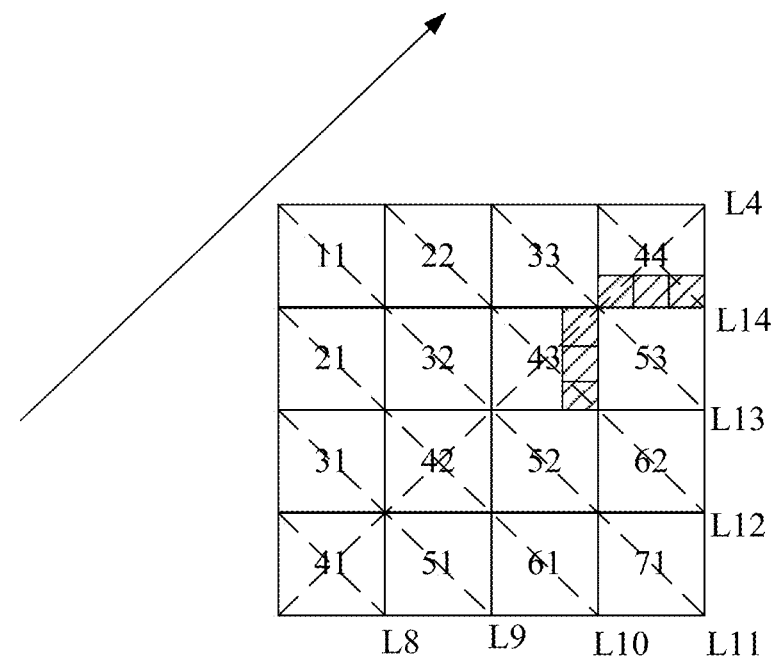
FIG. 6 is a schematic diagram of an HEVC method according to another embodiment of the present disclosure.

The pixel block diagonal straight line is a straight line on which a pixel block diagonal is located. As shown in FIG. 5, in a video image, a plurality of dashed lines L1 to L7 parallel to each other along a direction is pixel block diagonal straight lines. Further, as shown in FIG. 6, still in the video image, a plurality of dashed lines L8 to L14 parallel to each other along another direction is also pixel block diagonal straight lines. It can be learned that there are two groups of pixel block diagonal straight lines along different directions in one video image.

As shown in FIG. 5, there is at least one pixel block on each pixel block diagonal straight line. For example, there is only a pixel block 11 on the pixel block diagonal straight line L1, there is only a pixel block 71 locates on the pixel block diagonal straight line L7, and there are two pixel blocks, a pixel block 21 and a pixel block 22, on the pixel block diagonal straight line L2.

The pixel block diagonal straight line L5 is used as an example. In a process of performing parallel coding on a pixel block 51 to a pixel block 53 on the pixel block diagonal straight line L5, reference needs to be made to a coded pixel block 41 to a coded pixel block 44 on the adjacent pixel block diagonal straight line L4 (being adjacent to the pixel block diagonal straight line L5).

In an embodiment, in a process of coding a pixel block on the pixel block diagonal straight line L3, reference may be made to an adjacent coded pixel block (being adjacent to the pixel block) on the adjacent pixel block diagonal straight line L2.

Specifically, a pixel block 32 is used as an example. During coding of the pixel block 32, reference needs to be made to the coded pixel block 22 and the coded pixel block 21. Further, a pixel block 33 is used as an example. During coding of the pixel block 33, reference needs to be made to the coded pixel block 22. It can be learned that an adjacent coded pixel block may be one adjacent coded pixel block or two adjacent coded pixel blocks. Usually, a better coding effect can be obtained when reference is made to two adjacent coded pixel blocks.

In step S120, the parallel coding is sequentially performed on pixel blocks on a plurality of pixel block diagonal straight lines along a video image diagonal intersecting with the pixel block diagonal straight lines.

As shown in FIG. 5, L11 is a video image diagonal (also a pixel block diagonal straight line shown in FIG. 6), and L4 is another video image diagonal (also a pixel block diagonal straight line). The video image diagonal L11 separately intersects with the pixel block diagonal straight lines L1 to L7.

A direction of an arrow (along the video image diagonal L11) in FIG. 5 indicates a coding sequence of pixel blocks. To be specific, parallel coding is first performed on the pixel blocks on the video image diagonal L2, and then parallel coding is performed on the pixel blocks on the video image diagonal L3, until parallel coding is performed on pixel blocks on the video image diagonal L6.

When the parallel coding is performed on the pixel blocks on the video image diagonal L3, the pixel blocks on the video image diagonal L2 have been coded, and therefore for the pixel blocks on the video image diagonal L3, reference may be made to the coded pixel blocks on the video image diagonal L2. Likewise, when the parallel coding is performed on the pixel blocks on the video image diagonal L6, the pixel blocks on the video image diagonal L5 have been coded, and therefore for the pixel blocks on the video image diagonal L6, reference may be made to the coded pixel blocks on the video image diagonal L5.

Therefore, according to the method in this embodiment, a pixel block dependency in the HEVC coding process is eliminated, so that parallel coding can be performed on the pixel blocks, thereby improving a coding speed.

Specifically, when the pixel block is a PB or a TB, according to the method in this embodiment, a reconstructed pixel dependency during intra-frame prediction can be eliminated because during reconstruction of a pixel in a CU on a pixel block diagonal straight line, a pixel in an adjacent CU has been reconstructed, that is, the pixel in the adjacent CU is a reconstructed pixel.

When the pixel block is a PB, according to the method in this embodiment, an MPM computing dependency can be eliminated. When an intra-frame prediction mode is performed on the PB, an adjacent LPB and APB to which reference needs to be made have been coded, and prediction modes of the LPB and the APB are obtained.

When probabilistic model computing is performed on a pixel block, because an adjacent coded pixel block of the pixel block has been coded, a probabilistic model of the pixel block has been obtained.

The HEVC method may be applied to real-time transcoding of a live video stream. Viewing ends of the live video stream are different, including a PC end, a web end, and a mobile phone end, and the mobile phone end is further classified into a high-configuration mobile phone end, a middle-configuration mobile phone end, and a low-configuration mobile phone end. Performance of the viewing ends also varies, and network bandwidths of the viewing ends are also different. Therefore, it can be very beneficial to push videos of different resolutions and bit rates to different ends. A feature of the live video stream is that the pushed different streams can be synchronized. Therefore, the HEVC method is very suitable for real-time transcoding of the live video stream.

In an embodiment, as shown in FIG. 5, a direction opposite to the arrow may indicate a coding sequence of pixel blocks. To be specific, parallel coding is first performed on the pixel blocks on the pixel block diagonal straight line L6, and then parallel coding is performed on the pixel blocks on the pixel block diagonal straight line L5, until parallel coding is performed on the pixel blocks on the pixel block diagonal straight line L2.

In this embodiment, when parallel coding is performed on pixel blocks on a pixel block diagonal straight line, coded pixel blocks are located below the pixel blocks and/or on the right of the pixel blocks.

In an embodiment, as shown in FIG. 6, for the same video image, parallel coding may further be performed on pixel blocks on a plurality of pixel block diagonal straight lines along a direction of an arrow (along the video image diagonal L4) shown in FIG. 6. In this embodiment, when parallel coding is performed on pixel blocks on a pixel block diagonal straight line, coded pixel blocks are located below the pixel blocks and/or on the left of the pixel blocks.

According to the methods in the foregoing two embodiments, the pixel block dependency in the HEVC coding process can also be eliminated, thereby implementing the parallel coding on the pixel blocks.

In an embodiment, to more accurately and efficiently perform parallel coding on pixel blocks on a pixel block diagonal straight line, reference needs to be made to a set pixel in an adjacent coded pixel block of the pixel block, for example, an adjacent set pixel of the pixel block.

The pixel block 53 in FIG. 5 is used as an example. During coding of the pixel block 53, reference needs to be made to pixels (shadow parts in FIG. 5) that are in the adjacent coded pixel blocks 43 and 44 and that are adjacent to the pixel block 53.

It is noted that, as shown in FIG. 5, in a video image, during coding of the pixel block 11 on the pixel block diagonal straight line L1, because there is only the pixel block 11 on the pixel block diagonal straight line L1, it may also be considered that parallel coding is performed on the pixel block 11. In this case, for the coding of the pixel block 11, reference may be made to a pixel block that is on the same location of a previous video image (a previous frame).

When parallel coding is performed on pixel blocks on different pixel block diagonals in each video image, because the quantities of the pixel blocks on the different pixel block diagonals are different, processing loads may be imbalanced.

To resolve the problem of imbalanced loads, the present disclosure provides an HEVC method in the following embodiment.

In an embodiment, parallel coding is performed on pixel blocks in the second video image while parallel coding is performed on pixel blocks in the first video image, the sum of the quantity of pixel blocks in the second video image and on which parallel coding is performed and the quantity of pixel blocks in the first video image and on which parallel coding is performed being equal to a constant.

Figures 7, 8:
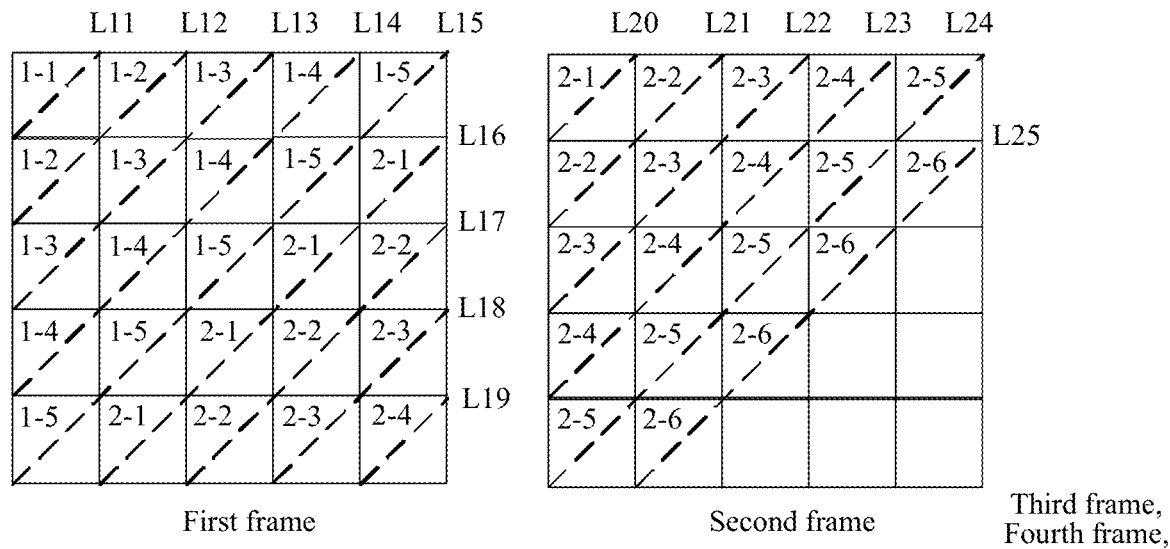
FIG. 7 is a schematic diagram of an HEVC method according to another embodiment of the present disclosure.
FIG. 8 is a schematic architectural diagram of a CPU in the related technology.

As shown in FIG. 7, pixel blocks with the same number indicate pixel blocks on which parallel coding is performed during same coding. For example, pixel blocks 2-1 on the pixel block diagonal straight line L16 in a first video image and a pixel block 2-1 on the pixel block diagonal straight line L20 in a second video image are coded at the same time or parallel coding is performed on the pixel blocks 2-1 on the pixel block diagonal straight line L16 in the first video image and the pixel block 2-1 on the pixel block diagonal straight line L20 in the second video image, and pixel blocks 2-2 on the pixel block diagonal straight line L17 in the first video image and pixel blocks 2-2 on the pixel block diagonal straight line L21 in the second video image are coded at the same time or parallel coding is performed the pixel blocks 2-2 on the pixel block diagonal straight line L17 in the first video image and the pixel blocks 2-2 on the pixel block diagonal straight line L21 in the second video image.

It can be learned from FIG. 7 that the sum of the quantity of pixel blocks in the second video image and on which parallel coding is performed and the quantity of pixel blocks in the first video image and on which parallel coding is performed is equal to a constant 5 each time. For example, the quantity of the pixel blocks 2-1 on the pixel block diagonal straight line L16 and the pixel block 2-1 on the pixel block diagonal straight line L20 is 5.

According to the technical solution in this embodiment, the quantity of pixel blocks on which parallel coding is performed is the same each time, so that load balance can be reached during each time of coding.

In an embodiment, the sum of the quantity of the pixel blocks in the second video image and on which the parallel coding is performed and the quantity of the pixel blocks in the first video image and on which the parallel coding is performed is equal to the quantity of pixel blocks on the video image diagonal. As shown in FIG. 7, the quantity of the pixel blocks 2-1 on the pixel block diagonal straight line L16 and the pixel block 2-1 on the pixel block diagonal straight line L20 is 5, which is exactly equal to the quantity 5 of the pixel blocks on the video image diagonal.

In some embodiments, the sum of the quantity of the pixel blocks in the second video image and on which the parallel coding is performed and the quantity of the pixel blocks in the first video image and on which the parallel coding is performed may also be a constant other than the quantity of the pixel blocks on the video image diagonal.

For example, in FIG. 7, parallel coding is performed on pixel blocks 1-5 on the pixel block diagonal straight line L15 and the pixel block 2-1 on the pixel block diagonal straight line L20, and parallel coding is performed on the pixel blocks 2-1 on the pixel block diagonal straight line L16 and the pixel blocks 2-2 on the pixel block diagonal straight line L21, and so on. In this embodiment, the sum of the quantity of pixel blocks in the second video image and on which parallel coding is performed and the quantity of pixel blocks in the first video image and on which parallel coding is performed is equal to a constant 6 each time.

According to the technical solution in this embodiment, the quantity of pixel blocks on which parallel coding is performed is the same each time, so that load balance can also be reached during each time of coding.

A sequence of performing parallel coding on the pixel blocks in the second video image may be different from a sequence of performing parallel coding on the pixel blocks in the first video image.

For example, in FIG. 7, the parallel coding may also be sequentially performed on the pixel blocks on the pixel block diagonal straight line in the second video image according to the direction of the arrow in FIG. 6.

In some embodiments, parallel coding needs to be performed on pixel blocks in a video image by using a CPU. To fully use a cache in the CPU, the present disclosure further provides the following embodiment.

Figure 9:
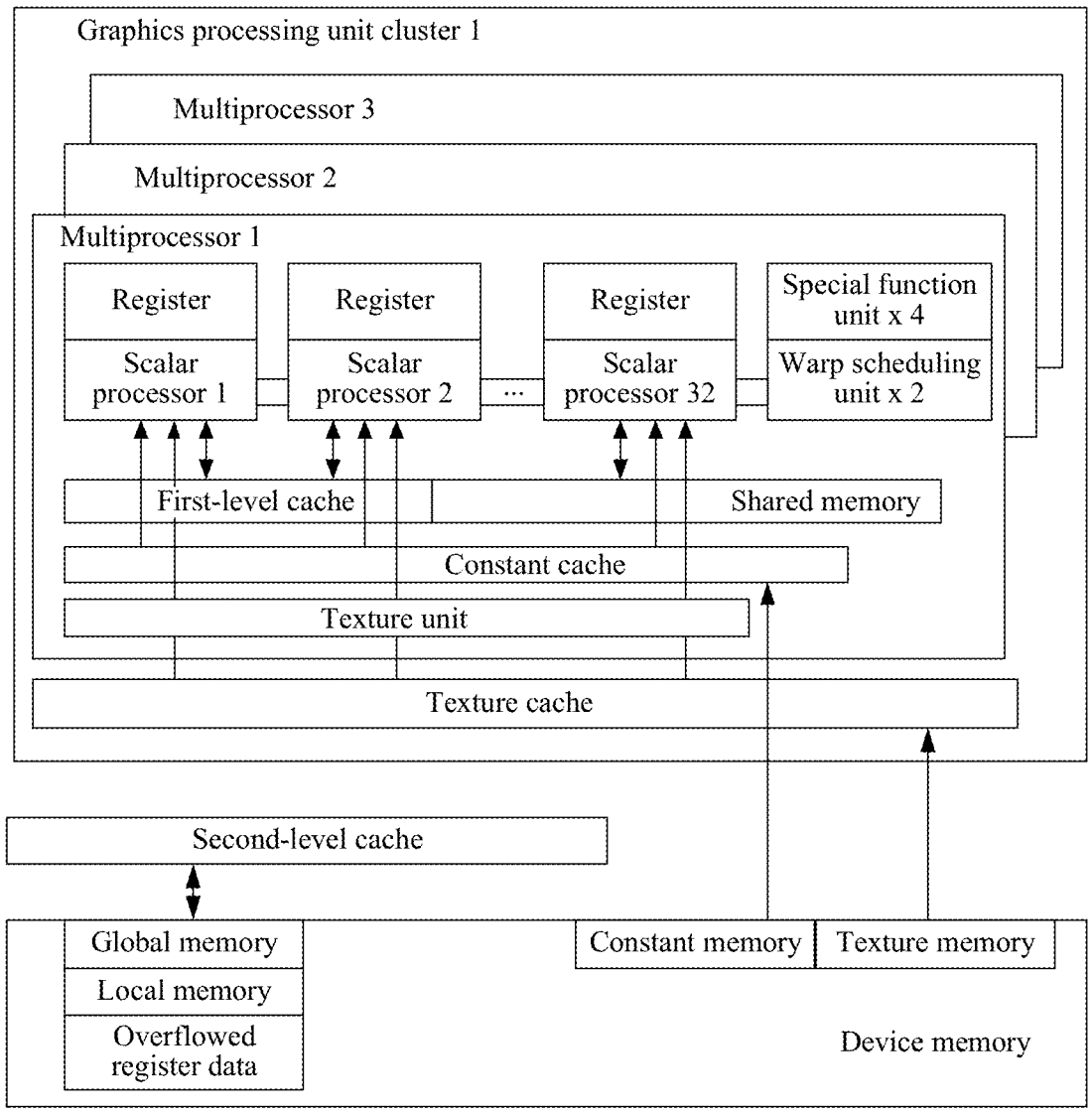
FIG. 9 is a schematic architectural diagram of a CUDA in the related technology.

Usually, there is a plurality of levels of caches in the CPU. As shown in FIG. 9, an Intel Xeon E3-1230 V3 CPU is used as an example. There are three levels of caches in the CPU in total.

A third-level cache has the largest capacity of 8 M and can store a plurality of frames of pictures of a video, but has the lowest speed.

A second-level cache has four blocks in total. Each block has a size of 256 KB and can store a frame or half a frame of data.

A first-level cache includes a first-level data cache and a first-level code cache, and has the smallest capacity but the highest speed. The first-level data cache has four blocks in total, and each block has a size of 32 KB.

To fully use the first-level data cache, in step S100, during division of a video image, it is ensured that a first-level data cache can store data that is used during coding of an integer multiple of pixel blocks, to avoid existence of redundant storage space in the first-level data cache. The data that is used when the pixel blocks are coded includes but is not limited to an original pixel value of a pixel block, a pixel block to which reference is made or a reconstructed pixel value of a pixel, a prediction mode of an adjacent coded pixel block, a probabilistic model of an adjacent coded pixel block, and the like.

It may be understood that, if the first-level data cache is sufficiently large, a plurality of frames of video images can be accommodated, and therefore the video image does not need to be divided into pixel blocks according to the size of the first-level data cache.

In addition, when parallel coding is performed on pixel blocks of a video image by using a GPU, a cache of the GPU also needs to be fully used, and it also needs to be ensured that a related cache can store data that is used during coding of an integer multiple of pixel blocks.

In some embodiments, parallel coding needs to be performed on pixel blocks in a video image by using a GPU. To fully use a thread in the GPU, the present disclosure further provides the following embodiment.

Usually, a GPU that supports a Compute Unified Device Architecture (CUDA) mainly includes a stream multiprocessor (SM) array. Different GPUs include different quantities of SMs. Each SM further includes a specific quantity of scalar stream processors (SP), and each SM has respective resources. The SMs are independent from each other and execute respective threads in parallel, and the thread is actually executed by each SP in the SM.

As shown in FIG. 9, in a GPU having a computing capability 2.0, an SM further includes a hardware resource such as 32 scalar SPs, an instruction unit, a 32-bit register set, a shared memory, a constant cache, and a texture cache.

A parallel program of CUDA has three levels of parallel scheduling in total:

Kernel functions (Kernel) are invoked in parallel. For example, kernel functions Kernel 1 and Kernel 2 are invoked in parallel.

Figure 10:
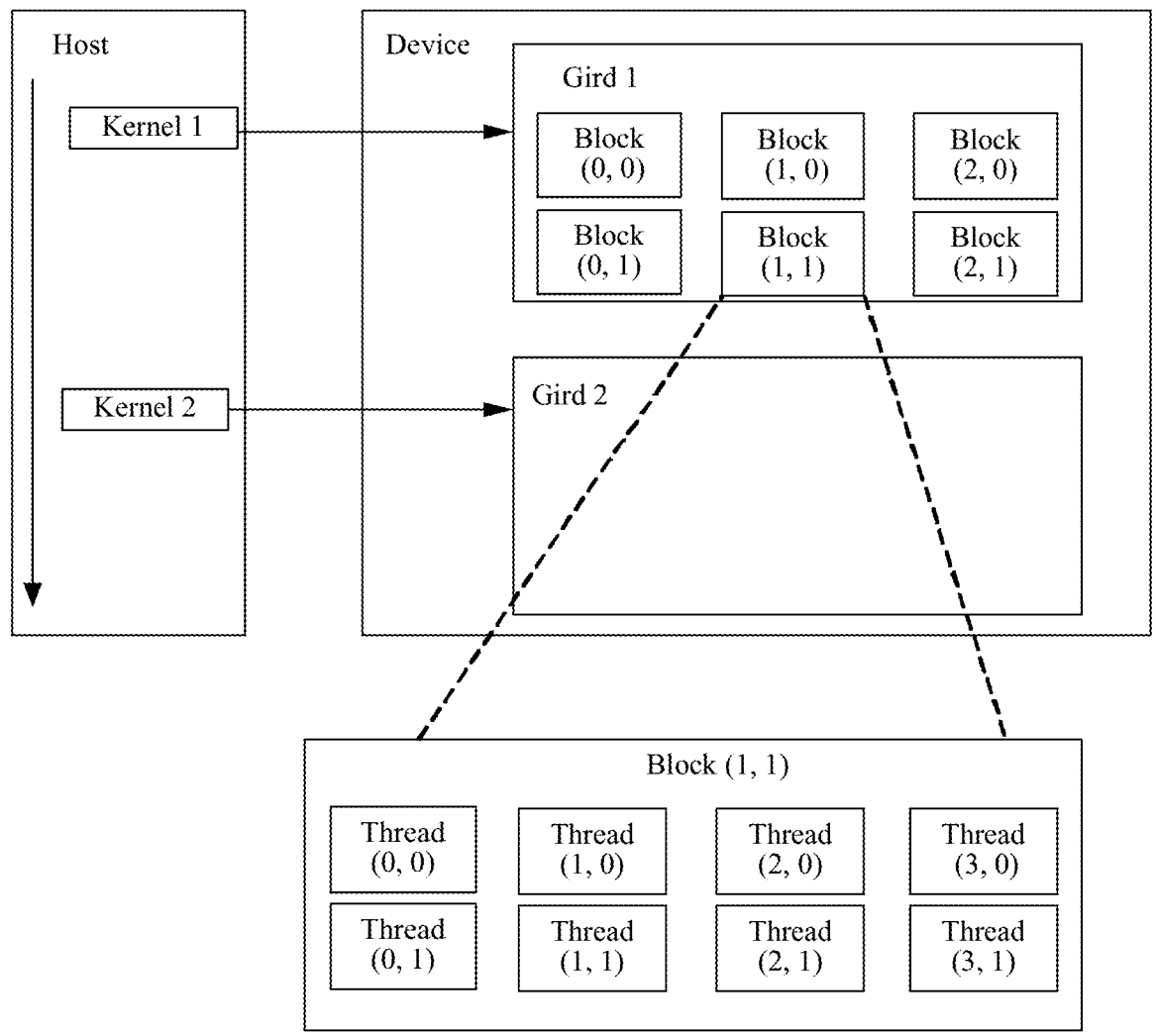
FIG. 10 is a thread structure of CUDA parallel computing in the related technology.

Each kernel function invokes a plurality of thread blocks in parallel, and each kernel function corresponds to a thread group of a thread grid. A grid includes several thread blocks, and each thread block includes several threads, as shown in FIG. 10.

The threads in each thread block are executed in parallel.

During execution of a CUDA program, each SP correspondingly executes one thread, each SM corresponds to one block, but one SM may have a plurality of active thread blocks (Active Block) at the same time, and the active thread blocks are executed in parallel.

Therefore, when the video image is divided into a plurality of pixel blocks, it needs to be ensured that the quantity of pixel blocks on which parallel coding is performed each time is an integer multiple of the quantity of SPs, so that it can be ensured that no SP is idle.

For example, if the quantity of SPs in an SM is n, and the quantity of pixel blocks on which parallel coding is performed each time is 4n, parallel coding needs to be performed on the pixel blocks by using four SMs. That is, there are four active blocks in a grid.

In an embodiment, to improve coding efficiency, the parallel coding may be performed on the pixel blocks of the video image by jointly using a CPU and a GPU.

A first quantity of pixel blocks that is in a positive correlation with a CPU computing capability is allocated to the CPU, and a second quantity of pixel blocks that is in a positive correlation with a GPU computing capability is allocated to the GPU, the sum of the first quantity of pixel blocks and the second quantity of pixel blocks being equal to the quantity of pixel blocks in a video image each time the parallel coding is performed.

Specifically, a corresponding quantity of pixel blocks may be allocated to the CPU and the GPU according to the following formulas:

$$\begin{cases} \frac{\text{Task}_C}{\text{Task}_G} = \frac{S_C}{S_G} \\ \text{Task}_C + \text{Task}_G = b \end{cases}$$

$\text{Task}_C$ and $\text{Task}_G$ respectively being the quantity of pixel blocks allocated to the CPU and the quantity of pixel blocks allocated to the GPU, and $S_C$ and $S_G$ respectively being a computing capability of the CPU and a computing capability of the GPU.

Figure 11:
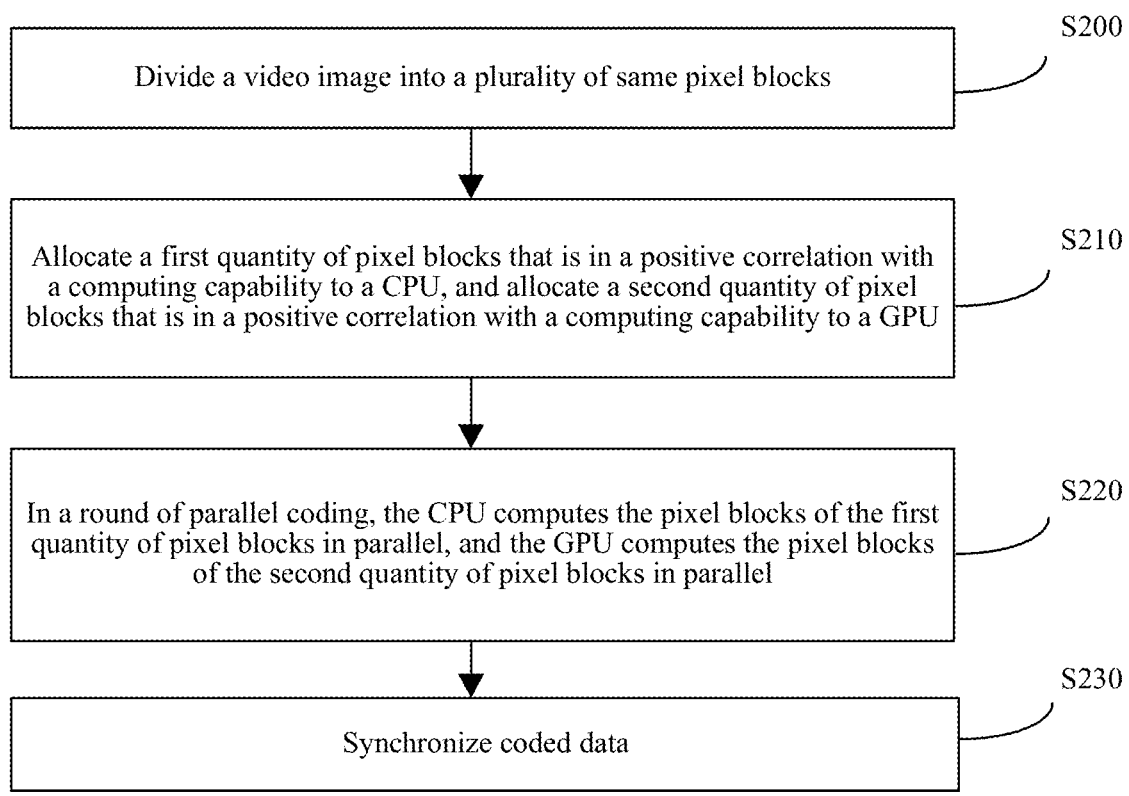
FIG. 11 is a schematic flowchart of an HEVC method according to an embodiment of the present disclosure.

FIG. 11 shows performing an HEVC method by jointly using a CPU and a GPU according to another embodiment of the present disclosure, including the following steps:

In step S200, a video image is divided into a plurality of pixel blocks with each of the plurality of pixel blocks having a same size.

In an embodiment, during division of a video image, it is ensured that a first-level data cache can store data that is used during coding of an integer multiple of pixel blocks, to avoid existence of redundant storage space in the first-level data cache.

For a specific execution step, reference may be made to the foregoing embodiment. This is not described herein again.

In step S210, a first quantity of pixel blocks that is in a positive correlation with a computing capability to the CPU is allocated, and a second quantity of pixel blocks that is in a positive correlation with a computing capability to the GPU is allocated. The sum of the first quantity of pixel blocks and the second quantity of pixel blocks is equal to the quantity of pixel blocks in a video image each time parallel coding is performed.

For a specific execution step, reference may be made to the foregoing embodiment. This is not described herein again.

In step S220, in a round of parallel coding, the CPU computes the pixel blocks of the first quantity of pixel blocks in parallel, and the GPU computes the pixel blocks of the second quantity of pixel blocks in parallel.

In step S230, coded data is synchronized. After all pixel blocks are coded in the round of parallel coding, step S220 is performed again, to perform a next round of parallel coding.

For a specific execution step, reference may be made to the foregoing embodiment. This is not described herein again.

Figure 12:
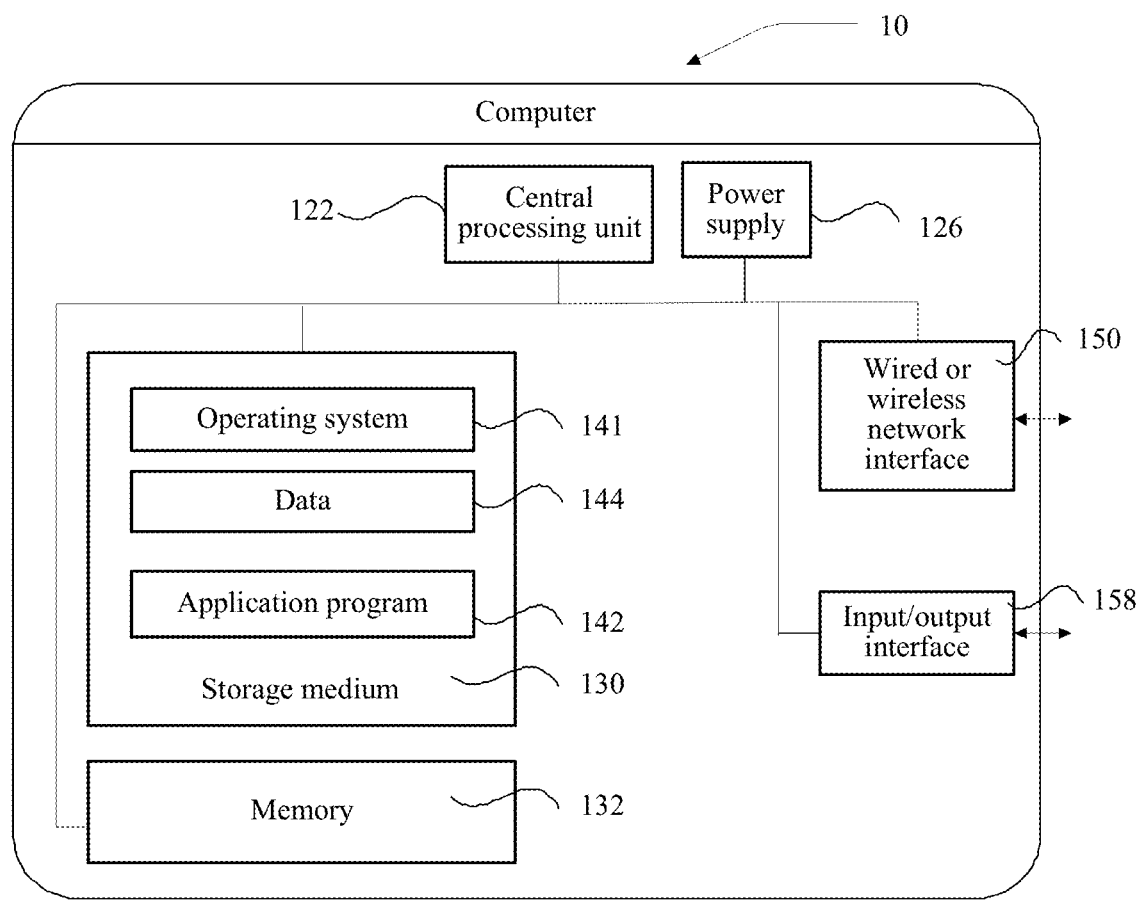
FIG. 12 is a schematic diagram of hardware performing an HEVC method according to an embodiment of the present disclosure.

FIG. 12 shows a structure of a computer according to an embodiment of the present disclosure. The computer is configured to perform an HEVC method.

The computer 10 may vary greatly due different configurations or performance, and may include one or more CPUs 122 (for example, one or more processors) and memories 132, and one or more storage media 130 (for example, one or more mass storage devices) storing an application program 142 or data 144. The memory 132 and the storage medium 130 may be transient or persistent storages. The program executing the HEVC method is stored in the storage media 130. Further, the CPU 122 may be configured to communicate with the storage media 130. The program in the storage media 130 is executed on the computer 10. The computer 10 may further include one or more power supplies 126, one or more wired or wireless network interfaces 150, one or more input/output interfaces 158, and/or one or more operating systems 141, for example, Windows Server™, Mac OS X™, Unix™, Linux™, or FreeBSD™.

More specifically, in step S100, the CPU 122 reads a stored video image from the memory 132, and divides the video image into a plurality of same pixel blocks.

In step S110, the CPU 122 performs the following parallel coding on each pixel block on a pixel block diagonal straight line: performing parallel c reference to a coded pixel block on an adjacent pixel block diagonal straight line.

In step S120, the parallel coding is sequentially performed on pixel blocks on a plurality of pixel block diagonal straight lines along a video image diagonal intersecting with the pixel block diagonal straight lines.

Figure 13:
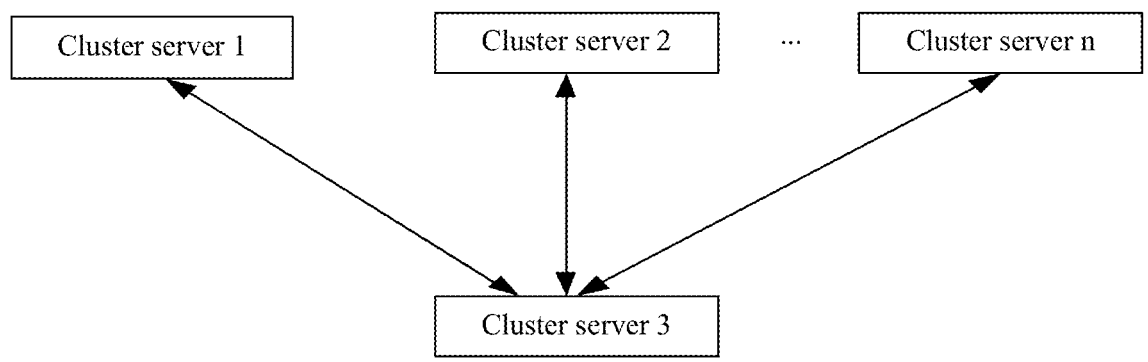
FIG. 13 is a schematic diagram of hardware performing an HEVC method according to another embodiment of the present disclosure.

FIG. 13 shows a hardware execution environment of an HEVC method according to another embodiment, including a master server and a cluster server 1 to a cluster server n.

The master server is configured to: allocate a corresponding quantity of video images to each cluster server according to a computing capability of each cluster server; and allocate more video images to a cluster server that has a stronger computing capability.

Each cluster server performs the HEVC method according to steps S100 to S120.

Result data that is obtained by performing the HEVC method by each cluster server may be transmitted to a next cluster server that needs to perform coding by depending on the result data.

Figure 14:
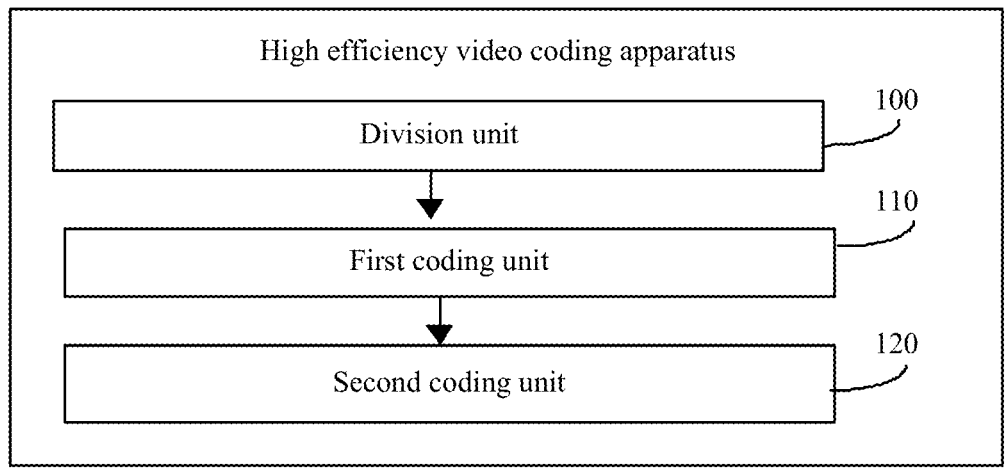
FIG. 14 is a schematic diagram of an HEVC apparatus according to an embodiment of the present disclosure.

FIG. 14 shows an HEVC apparatus according to an embodiment of the present disclosure. The apparatus includes:

a division unit 100, configured to divide a video image into a plurality of pixel blocks having the same size;

a first CU 110, configured to perform the following parallel coding on each pixel block on a pixel block diagonal straight line: performing parallel coding on each pixel block with reference to a coded pixel block on an adjacent pixel block diagonal straight line; and a second CU 120, configured to: sequentially perform the parallel coding on pixel blocks on a plurality of pixel block diagonal straight lines other than the pixel block diagonal straight line along a video image diagonal intersecting with the pixel block diagonal straight line.

For an implementation process of the HEVC apparatus in this embodiment, specifically refer to the implementation process of corresponding steps in the foregoing HEVC method. This is not described herein again.

Figure 1:
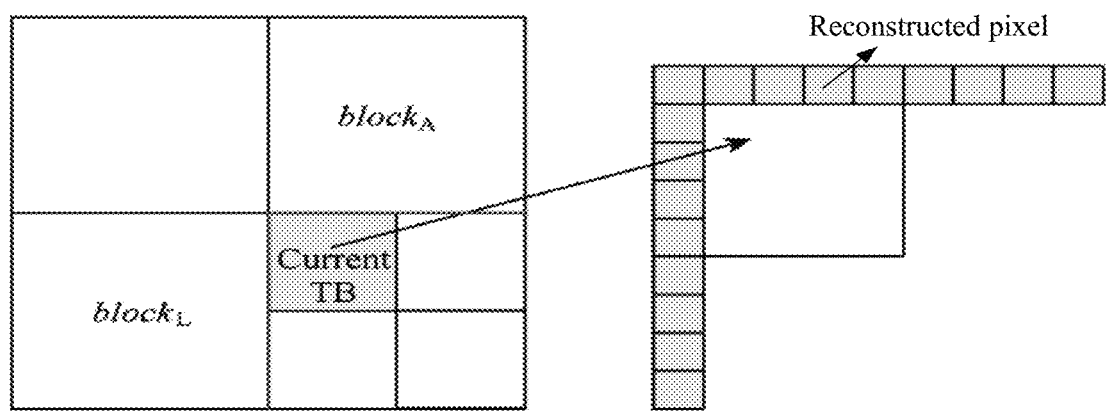
FIG. 1 is a schematic diagram of a reconstructed pixel dependency during intra-frame prediction in an HEVC coding process in the related technology.
Figure 2:
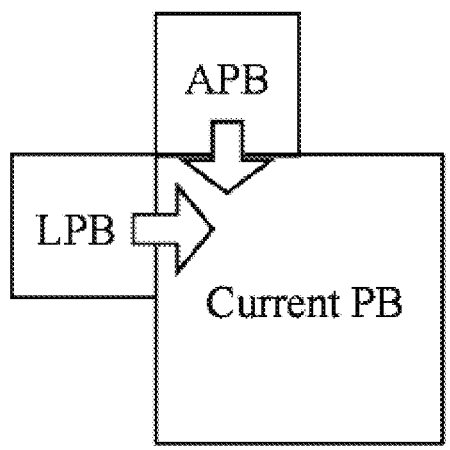
FIG. 2 is a schematic diagram of an MPM computing dependency in a coding prediction mode in an HEVC coding process in the related technology.
Figure 3:
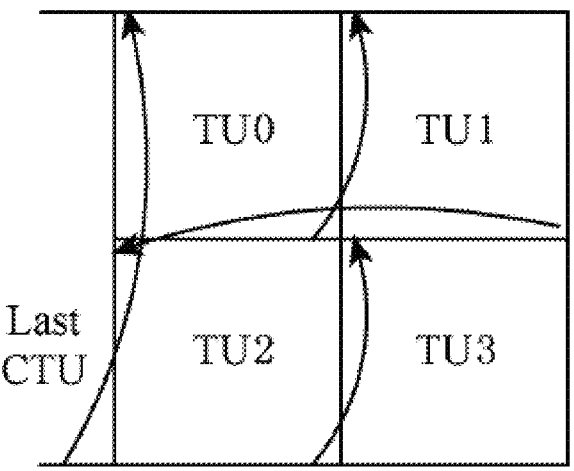
FIG. 3 is a schematic diagram of a probabilistic characteristic model (PCM) inherited dependency in an HEVC coding process in the related technology.

The present disclosure further provides an electronic device. The electronic device may be applied to the cluster server 1 to the cluster server n in the implementation environment shown in FIG. 13, to perform all or some of the steps in the HEVC method shown in FIG. 3 or FIG. 11. The electronic device includes:

a processor; and a memory, configured to store processor executable instructions, the processor being configured to perform the foregoing HEVC method.

A specific manner in which the processor of the electronic device in this embodiment has been described in detail in the embodiments related to the HEVC method. This is not described in detail herein again.

In an exemplary embodiment, the present disclosure further provides a storage medium. The storage medium is a computer-readable storage medium. For example, the storage medium may be a transitory or non-transitory computer-readable storage medium including instructions. The storage medium stores a computer program, and the computer program may be executed by the CPU 122 of the computer 10 to implement the foregoing HEVC method. The computer program may also be executed on other types of computers or components including, for example, personal computers, tablet computers, servers, smartphones, gaming devices, interne of things devices, and the like.

It is understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A method for video coding, the method comprising:
dividing, by processing circuitry of an apparatus, a first video image into a plurality of pixel blocks of a same size, the plurality of pixel blocks of the first video image being arranged into multiple pixel block sets, each set of the pixel block sets including one or more pixel blocks from the plurality of pixel blocks on a respective reference line in parallel with a first diagonal line of the first video image;
determining, by the processing circuitry and from the pixel block sets according to an order defined from one corner of the first video image to another corner of the first video image that define a second diagonal line of the first video image different from the first diagonal line, a selected pixel block set, any pixel block set of the pixel block sets prior to the selected pixel block set according to the order has been coded, and any pixel block set of the pixel block sets after the selected pixel block set according to the order has not been coded; and
performing, by the processing circuitry, a parallel coding on the one or more pixel blocks of the selected pixel block set based on at least one pixel block set of the pixel block sets that has been coded.

2. The method according to claim 1, wherein the performing the parallel coding comprises:
performing, by the processing circuitry, the parallel coding on the one or more pixel blocks of the selected pixel block set and one or more pixel blocks in a second video image, such that a sum of a quantity of the one or more pixel blocks in the second video image and a quantity of the one or more pixel blocks of the selected pixel block set in the first video image is a constant.

3. The method according to claim 1, wherein
a pixel block of the at least one pixel block set that has been coded is a neighboring block of one of the one or more pixel blocks of the selected pixel block set, and
the performing the parallel coding comprises:
coding, by the processing circuitry as part of the parallel coding, the one of the one or more pixel blocks of the selected pixel block set based on a pixel in the pixel block of the at least one pixel block set.

4. The method according to claim 1, wherein
a pixel block of the at least one pixel block set that has been coded is a neighboring block of one of the one or more pixel blocks of the selected pixel block set, and
the performing the parallel coding comprises:
coding, by the processing circuitry as part of the parallel coding, the one of the one or more pixel blocks of the selected pixel block set based on a neighboring pixel in the pixel block of the at least one pixel block set, the neighboring pixel neighboring the one of the one or more pixel blocks of the selected pixel block set.

5. The method according to claim 2, wherein the sum of the quantity of the one or more pixel blocks in the second video image and the quantity of the one or more pixel blocks of the selected pixel block set in the first video image is equal to a quantity of pixel blocks on the first diagonal line of the first video image.

6. The method according to claim 1, further comprising:
when the processing circuitry includes a central processing unit (CPU) and a graphics processing unit (GPU), allocating, by the processing circuitry, a first quantity of pixel blocks to the CPU, and a second quantity of pixel blocks to the GPU, such that a sum of the first quantity of pixel blocks and the second quantity of pixel blocks is equal to a total quantity of pixel blocks on which the parallel coding is performed.

7. An apparatus for video coding, the apparatus comprising:
processing circuitry configured to
divide a first video image into a plurality of pixel blocks of a same size, the plurality of pixel blocks of the first video image being arranged into multiple pixel block sets, each set of the pixel block sets including one or more pixel blocks from the plurality of pixel blocks on a respective reference line in parallel with a first diagonal line of the first video image;
determine, from the pixel block sets according to an order defined from one corner of the first video image to another corner of the first video image that define a second diagonal line of the first video image different from the first diagonal line, a selected pixel block set, any pixel block set of the pixel block sets prior to the selected pixel block set according to the order has been coded, and any pixel block set of the pixel block sets after the selected pixel block set according to the order has not been coded; and perform a parallel coding on the one or more pixel blocks of the selected pixel block set based on at least one pixel block set of the pixel block sets that has been coded.

8. The apparatus according to claim 7, wherein the processing circuitry is further configured to:

perform the parallel coding on the one or more pixel blocks of the selected pixel block set and one or more pixel blocks in a second video image, such that a sum of a quantity of the one or more pixel blocks in the second video image and a quantity of the one or more pixel blocks of the selected pixel block set in the first video image is a constant.

9. The apparatus according to claim 7, wherein a pixel block of the at least one pixel block set that has been coded is a neighboring block of one of the one or more pixel blocks of the selected pixel block set, and the processing circuitry is further configured to:

code, as part of the parallel coding, the one of the one or more pixel blocks of the selected pixel block set based on a pixel in the pixel block of the at least one pixel block set.

10. The apparatus according to claim 7, wherein a pixel block of the at least one pixel block set that has been coded is a neighboring block of one of the one or more pixel blocks of the selected pixel block set, and the processing circuitry is further configured to:

code, as part of the parallel coding, the one of the one or more pixel blocks of the selected pixel block set based on a neighboring pixel in the pixel block of the at least one pixel block set, the neighboring pixel neighboring the one of the one or more pixel blocks of the selected pixel block set.

11. The apparatus according to claim 8, wherein the sum of the quantity of the one or more pixel blocks in the second video image and the quantity of the one or more pixel blocks of the selected pixel block set in the first video image is equal to a quantity of pixel blocks on the first diagonal line of the first video image.

12. The apparatus according to claim 7, wherein the processing circuitry includes a central processing unit (CPU) and a graphics processing unit (GPU).

13. The apparatus according to claim 12, wherein the processing circuitry is further configured to:

allocate a first quantity of pixel blocks to the CPU, and a second quantity of pixel blocks to the GPU, such that a sum of the first quantity of pixel blocks and the second quantity of pixel blocks is equal to a total quantity of pixel blocks on which the parallel coding is performed.

14. A non-transitory computer-readable medium storing therein computer-readable instructions which when executed by a computer cause the computer to perform:

dividing a first video image into a plurality of pixel blocks of a same size, the plurality of pixel blocks of the first video image being arranged into multiple pixel block sets, each set of the pixel block sets including one or more pixel blocks from the plurality of pixel blocks on a respective reference line in parallel with a first diagonal line of the first video image;

determining, from the pixel block sets according to an order defined from one corner of the first video image to another corner of the first video image that define a second diagonal line of the first video image different from the first diagonal line, a selected pixel block set, any pixel block set of the pixel block sets prior to the selected pixel block set according to the order has been coded, and any pixel block set of the pixel block sets after the selected pixel block set according to the order has not been coded; and performing a parallel coding on the one or more pixel blocks of the selected pixel block set based on at least one pixel block set of the pixel block sets that has been coded.

15. The non-transitory computer-readable medium according to claim 14, wherein the computer-readable instructions which when executed by the computer cause the computer to further perform:

performing the parallel coding on the one or more pixel blocks of the selected pixel block set and one or more pixel blocks in a second video image, such that a sum of a quantity of the one or more pixel blocks in the second video image and a quantity of the one or more pixel blocks of the selected pixel block set in the first video image is a constant.

16. The non-transitory computer-readable medium according to claim 14, wherein a pixel block of the at least one pixel block set that has been coded is a neighboring block of one of the one or more pixel blocks of the selected pixel block set, and the computer-readable instructions which when executed by the computer cause the computer to further perform:

coding, as part of the parallel coding, the one of the one or more pixel blocks of the selected pixel block set based on a pixel in the pixel block of the at least one pixel block set.

17. The non-transitory computer-readable medium according to claim 14, wherein a pixel block of the at least one pixel block set that has been coded is a neighboring block of one of the one or more pixel blocks of the selected pixel block set, and the computer-readable instructions which when executed by the computer cause the computer to further perform:

coding, as part of the parallel coding, the one of the one or more pixel blocks of the selected pixel block set based on a neighboring pixel in the pixel block of the at least one pixel block set, the neighboring pixel neighboring the one of the one or more pixel blocks of the selected pixel block set.

18. The non-transitory computer-readable medium according to claim 15, wherein the sum of the quantity of the one or more pixel blocks in the second video image and the quantity of the one or more pixel blocks of the selected pixel block set in the first video image is equal to a quantity of pixel blocks on the first diagonal line of the first video image.

19. The non-transitory computer-readable medium according to claim 14, wherein the computer-readable instructions which when executed by the computer cause the computer to further perform:

performing the parallel coding on pixel blocks by using a central processing unit (CPU) and a graphics processing unit (GPU).

20. The non-transitory computer-readable medium according to claim 19, wherein the computer-readable instructions which when executed by the computer cause the computer to further perform:

allocating a first quantity of the pixel blocks to the CPU, and a second quantity of the pixel blocks to the GPU, such that a sum of the first quantity of the pixel blocks and the second quantity of the pixel blocks is equal to a total quantity of the pixel blocks on which the parallel coding is performed.

* * * * *